US012620768B2

(12) United States Patent
Hagemann et al.

(10) Patent No.: US 12,620,768 B2
(45) Date of Patent: May 5, 2026

(54) NON-COLLINEARLY PHASE-MATCHED FREQUENCY MIXING

(71) Applicant: Coherent LaserSystems GMBH & Co. KG, Göttingen (DE)

(72) Inventors: Christian Hagemann, Pogeez (DE); Jens Schüttler, Hamburg (DE)

(73) Assignee: Coherent LaserSystems GMBH & Co. KG, Göttingen (DE)

( * ) Notice: Subject to any disclaimer, the term of this patent is extended or adjusted under 35 U.S.C. 154(b) by 710 days.

(21) Appl. No.: 17/975,475

(22) Filed: Oct. 27, 2022

(65) Prior Publication Data

US 2024/0146017 A1 May 2, 2024

(51) Int. Cl.
*H01S 3/10* (2006.01)
*H01S 3/00* (2006.01)
(Continued)

(52) U.S. Cl.
CPC ............ *H01S 3/109* (2013.01); *H01S 3/0092* (2013.01); *H01S 3/1611* (2013.01); *H01S 3/1643* (2013.01)

(58) Field of Classification Search
CPC ...... H01S 3/109; H01S 3/0092; H01S 3/1611; H01S 3/1643
See application file for complete search history.

(56) References Cited

U.S. PATENT DOCUMENTS 3,983,406 A * 9/1976 Lax ........................ G02F 1/3534
359/326
5,136,597 A * 8/1992 Nightingale ............ H01S 3/109
359/328

(Continued)

FOREIGN PATENT DOCUMENTS

| CN | 103050880 A | 4/2013 |
| CN | 112366504 B | 10/2022 |
| JP | 2007086582 A | 4/2007 |

OTHER PUBLICATIONS

Chen, (2017). "Doctoral Dissertation: Research about coherent ultra-violet light sources based on nonlinear conversion with borate crystal," Osaka University, Graduate School of Engineering, 122 pages.

(Continued)

*Primary Examiner* — Kinam Park
(74) *Attorney, Agent, or Firm* — Morrison & Foerster LLP

(57) ABSTRACT

A laser apparatus with non-collinearly phase-matched frequency mixing includes a nonlinear crystal generating an output laser beam from non-collinearly phase-matched frequency mixing of first and second input laser beams. The output laser beam is subject to walk-off in a walk-off plane. The second input laser beam is less powerful than the first input laser beam. The first input laser beam is directed to more closely align its Poynting vector to the output beam Poynting vector than in collinear phase matching. To achieve good spatial overlap in this phase matching scheme, the second input laser beam is elongated in the walk-off plane, such that the second input laser beam has a greater transverse size than the first input laser beam in the walk-off plane. This non-collinear phase matching scheme is capable of achieving an improved beam quality of the output beam, as compared to collinear phase matching with circular input beams.

24 Claims, 5 Drawing Sheets

(51) Int. Cl.
    *H01S 3/109*         (2006.01)
    *H01S 3/16*          (2006.01)

(56)         References Cited

U.S. PATENT DOCUMENTS

| | | | | |
|---|---|---|---|---|
| 7,292,387 | B2 * | 11/2007 | Hoffman | G02F 1/3534 |
| | | | | 356/326 |
| 8,553,734 | B2 * | 10/2013 | Dong | G02F 1/3532 |
| | | | | 372/21 |
| 10,642,127 | B1 | 5/2020 | Simanovski et al. | |
| 2003/0043452 | A1 * | 3/2003 | Heist | G02F 1/3534 |
| | | | | 359/326 |
| 2006/0250677 | A1 | 11/2006 | Hoffman et al. | |
| 2020/0301243 | A1 * | 9/2020 | Babushkin | G02F 1/3551 |

OTHER PUBLICATIONS

Freegarde et al., (1997). "General analysis of type I second-harmonic generation with elliptical Gaussian beams," J Opt Soc Am B, 14(8):2010-2016.

Kurdi et al., (2004). "Optical Parametric Amplification of Femto-second Ultraviolet Laser Pulses," IEE Journal of Selected Topics in Quantum Electronics, 10(6):1259-1267.

Sakuma et al., (2004). "Generation of all-solid-state, high-power continuous-wave 213-nm light based on sum-frequency mixing in $CsLiB_6O_{10}$," Optic Letters, 29(10):1096-1098.

Dean et al., (2021). "Widely tunable second harmonic amplification by noncollinear phase matching in bulk birefringent materials," Proceedings of the SPIE, 11670:116700G, 9 pages.

Gloster et al., (1994). "Noncollinear phase matching in a type I barium borate optical parametric oscillator," Optics Communications, 112:328-332.

International Search Report and Written Opinion received for International Patent Application No. PCT/EP2023/079990 mailed on Jan. 26, 2024, 15 pages.

Shirakawa et al., (1998). "Noncollinear Phase- and Group-velocity Matching of Optical Parametric Amplifier for Ultrashort Pulse Generation," IEICE Transactions on Electronics, E81-C(2):246-253.

* cited by examiner

NON-COLLINEARLY PHASE-MATCHED FREQUENCY MIXING

TECHNICAL FIELD OF THE INVENTION

The present invention relates to walk-off compensation in nonlinear frequency conversion processes where the spatial beam overlap is significantly affected by walk-off, such as in sum-frequency mixing in the ultraviolet, where a long propagation path through a nonlinear crystal is often needed to achieve a desired output power. The present invention relates in particular to the impact of walk-off on the beam quality of the frequency-converted beam.

DISCUSSION OF BACKGROUND ART

Ultraviolet (UV) laser radiation has a variety of uses. High-power UV laser radiation is used to perform photolithography, laser machining, and eye surgery, for example, while moderate-power UV laser radiation has other applications such as semiconductor inspection, flow cytometry, and confocal microscopy. In microscopy and semiconductor inspection, the short wavelength of ultraviolet laser radiation enables detection of features that are smaller than those detectable with visible radiation.

In many situations, solid-state lasers are a preferred laser-source architecture. However, so far, no solid-state laser is capable of directly generating UV laser radiation with high or even moderate power. Instead, high- and moderate-power UV laser radiation is generated from solid-state lasers by frequency conversion of longer-wavelength laser radiation generated in the solid-state-laser gain medium. For example, neodymium-doped yttrium aluminum garnet (Nd:YAG) and neodymium-doped yttrium orthovanadate (Nd:YVO$_4$) crystals very effectively generate both continuous-wave and pulsed laser radiation with a wavelength of 1064 nm, and form the basis of many commonly used UV solid-state laser systems. Multi-stage sum-frequency generation in nonlinear crystals is used to convert 1064 nm laser radiation to ultraviolet laser radiation. Frequency-doubling of 1064 nm laser radiation to generate the second harmonic at 532 nm followed by sum-frequency mixing of 532 nm and 1064 nm laser radiation produces the third harmonic at 355 nm. In another approach, two stages of frequency doubling convert 1064 nm laser radiation to the fourth harmonic at 266 nm. Sum-frequency mixing of 266 nm and 1064 nm laser radiation produces the fifth harmonic at 213 nm.

Efficient frequency mixing in a nonlinear crystal relies on the input laser beam (or beams) being phase matched with the frequency-converted output laser beam, such that, as the input and output laser beams propagate through the nonlinear crystal, frequency-converted laser radiation generated at each spatial location interferes constructively with frequency-converted laser radiation generated at preceding spatial locations. This is a nontrivial task since the refractive index of the nonlinear crystal varies with wavelength.

Critical phase matching, also known as "angle phase matching", is the preferred phase matching technique in many scenarios and sometimes the only viable phase matching technique. Critical phase matching utilizes a birefringent nonlinear crystal and takes advantage of the polarization dependence of the refractive index of this birefringent nonlinear crystal. Critical phase matching is generally performed with linearly polarized beams and is most easily understood within the context of uniaxial birefringent crystals. A uniaxial crystal has an optic axis and is characterized by ordinary and extraordinary refractive indices. For any given laser beam, the optic axis of the uniaxial crystal and the wave vector of the laser beam together define a principal plane. A beam is termed an "ordinary" beam when its polarization is normal to the principal plane and an "extraordinary" beam when its polarization is parallel to the principal plane. An ordinary beam always experiences the ordinary refractive index. An extraordinary beam, on the other hand, experiences a refractive index in the range between the ordinary and extraordinary refractive indices, with the value of the refractive index depending on the angle between the wave vector and the optic axis. In critical phase matching, the interacting laser beams include both ordinary and extraordinary beams. For suitable combinations of crystal material and temperature, and wavelengths and polarization directions of the input beams, phase matching is achieved at a particular orientation of the optic axis of the nonlinear crystal relative to the wave vectors of the input beams.

Critical phase matching is most often performed with collinear beams. However, one or two of the interacting laser beams is subject to walk-off, i.e., the Poynting vector of each such beam is at a non-zero angle to the wave vector of the beam. In uniaxial crystals, extraordinary beams are subject to walk-off, and the walk-off angle depends on the difference between the ordinary and extraordinary refractive indices and the angle between the wave vector and the optic axis. Walk-off affects the spatial overlap between the interacting beams and limits the effective interaction length. This is particularly troublesome when a long interaction length is required to achieve the desired output power. Such situations may require walk-off compensation.

In a simple walk-off compensation scheme, the input beam sizes are increased to maintain a better spatial beam overlap in the presence of walk-off. This scheme is generally only useful when ample input power is available, which is often not the case. Another walk-off compensation scheme utilizes a twin-crystal, that is, a pair of nonlinear crystals imposing equal amounts of walk-off but oriented such that the walk-off in the second crystal is exactly opposite the walk-off in the first crystal. The twin-crystal scheme cuts the magnitude of walk-off in half. Non-collinear phase matching provides another method for walk-off compensation. When the constraint of parallel input beam wave vectors is relaxed, emphasis may instead be placed on Poynting vector alignment. However, even in non-collinear phase matching, it is generally not possible to align the Poynting vectors of all interacting beams. The optimal configuration is usually a compromise between optimizing spatial overlap between the input beams and optimizing spatial overlap between the input beams and the output beam.

SUMMARY OF THE INVENTION

Disclosed herein is a frequency-mixing technique that utilizes non-collinear critical phase matching, in conjunction with dissimilar beam sizes in the walk-off plane, to reduce the impact of walk-off so as to generate an output laser beam with high beam quality. The input beams are arranged such that the region of spatial overlap between the input beams is in better alignment with the Poynting vector of the output beam than would be the case with collinear phase matching, and one of the input beams is transversely elongated in the walk-off dimension to extend the length of this region of spatial overlap between the input beams. In certain scenarios, the present frequency-mixing technique is capable of optimizing the output beam quality without compromising the output power, as compared to frequency mixing based on conventional collinear phase matching and circular input beams.

Consider, for example, the challenge of sum-frequency mixing of 1064 nm and 266 nm continuous-wave laser beams to generate a 213 nm continuous-wave laser beam. Here, the 266 nm beam is the product of a fourth-harmonic generation process applied to a 1064 nm beam. This typically limits the 266 nm input power to not much more than 2 watts (W). Maximizing output power therefore entails maximizing transfer of 266 nm power to the 213 nm output beam. For that purpose, the 1064 nm input power is set high enough to substantially deplete the 266 nm beam, and the nonlinear crystal is long enough to allow this depletion to occur. With collinear type-I phase-matched sum-frequency mixing of ordinary 1064 nm and 266 nm beams, the generated extraordinary 213 nm radiation is subject to walk-off, resulting in an elongated output beam shape. The issue of walk-off is compounded by the gradual depletion of the 266 nm power through the length of the nonlinear crystal, further degrading the output beam quality.

Applying the present frequency-mixing technique to the example of type-I sum-frequency mixing of ordinary 1064 nm and 266 nm beams, the 1064 nm wave vector is oriented to be parallel (or at least less non-parallel) to the 213 nm Poynting vector. When perfectly parallel, the effect of walk-off on the output beam quality is eliminated. The 266 nm beam is shaped to be elongated in the walk-off dimension to ensure good spatial overlap between the non-collinear 266 nm and 1064 nm beams. Whereas depletion of the 266 nm beam presents a problem in the collinear phase matching scheme, the present frequency-mixing technique uses this depletion to its advantage. As the 1064 nm beam passes through the more spread-out 266 nm beam, the high 1064 nm power ensures effective transfer of 266 nm power to the 213 nm output beam. We have found that the present frequency-mixing technique can achieve the same 213 nm power as the collinear phase matching scheme, or even more, with a vastly improved beam quality.

The applicability of the present frequency-mixing technique is not limited to the example of 213 nm generation. More generally, the present technique is applicable to sum- and difference-frequency mixing processes subject to substantial walk-off that, in a collinear phase matching scheme, would cause the frequency-converted output beam to have an elongated beam shape in the walk-off dimension. The present frequency-mixing technique is also not limited to type-I phase matching with ordinary input beams. In the more general case, the beam quality is improved by the Poynting vector of a first one of the two input beams being parallel (or at least less non-parallel than in the collinear scheme) to the Poynting vector of the output beam, while the second input beam has a greater transverse size in the walk-off plane to ensure good spatial overlap between the two input beams. For example, the second input beam may have an oblong transverse intensity distribution. The present technique is particularly advantageous in scenarios where one input beam is sufficiently powerful that the other input beam is substantially depleted, such as in frequency mixing between a relatively weak ultraviolet input beam and a much more powerful infrared or visible input beam. Not only are these the scenarios that result in the greatest beam degradation in the collinear phase matching scheme but, additionally, the beam quality improvements provided by the present technique may, in these scenarios, be achieved at little or no cost in output power or even with an improvement in output power.

In one aspect, a laser apparatus with non-collinearly phase-matched frequency mixing includes a first laser source configured to generate a first input laser beam, a second laser source configured to generate a second input laser beam, and a nonlinear crystal arranged to generate an output laser beam from non-collinearly phase-matched frequency mixing of the first and second input laser beams. The output laser beam is subject to walk-off in a walk-off plane in the nonlinear crystal. Wave vectors of the first and second input laser beams are non-collinear and intersecting in the nonlinear crystal. The second input laser beam has a lower power than the first input laser beam in the nonlinear crystal. In the first nonlinear crystal, the angle between the Poynting vector of the first input laser beam and the Poynting vector of the output laser beam is smaller than the angle than between the Poynting vector of the second input laser beam and the Poynting vector of the output laser beam. The second input laser beam has a greater transverse size than the first input laser beam in the walk-off plane in the nonlinear crystal.

In another aspect, a method for non-collinearly phase-matched frequency mixing of laser beams includes steps of (a) generating first and second input laser beams, and (b) directing the first and second input laser beams into a nonlinear crystal such that (i) wave vectors of the first and second input laser beams are non-collinear and intersect in the nonlinear crystal, and (ii) the first and second wave vectors cooperate with the orientation of the nonlinear crystal to promote non-collinearly phase-matched frequency mixing of the first and second input laser beams resulting in generation of an output laser beam. The output laser beam is subject to walk-off in a walk-off plane in the nonlinear crystal. The first input laser beam is more powerful than the second input laser beam. The transverse size of the second input laser beam, in the walk-off plane, exceeds a corresponding transverse size of the first input laser beam. In the first nonlinear crystal, the angle between the Poynting vector of the first input laser beam and the Poynting vector of the output laser beam is smaller than the angle between the Poynting vector of the second input laser beam and the Poynting vector of the output laser beam.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

DETAILED DESCRIPTION OF THE INVENTION

Figure 1:
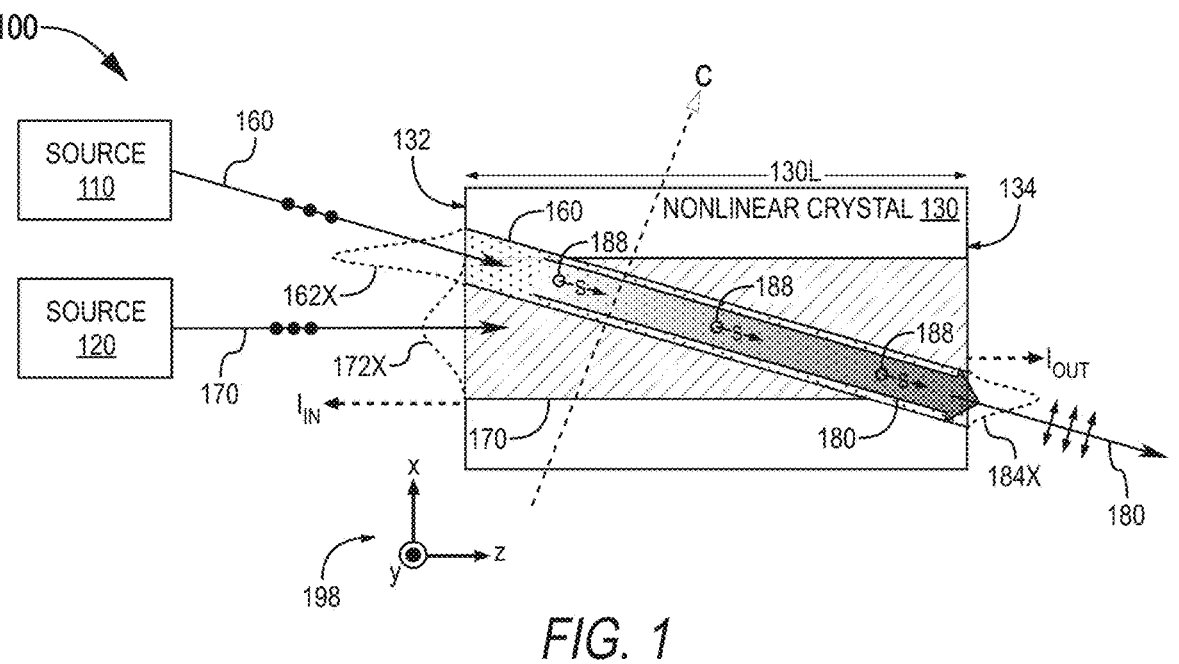
FIG. 1 illustrates a laser apparatus with non-collinear type-I phase-matched sum-frequency mixing of two input laser beams in a nonlinear crystal, according to an embodiment. Sum-frequency mixing of the input beams generates an output beam that is subject to walk-off in the nonlinear crystal. The frequency-mixing technique utilizes non-collinear critical phase matching, and one of the input beams is oblong in shape.

Referring now to the drawings, wherein like components are designated by like numerals, FIG. 1 illustrates one laser apparatus 100 with non-collinear type-I phase-matched sum-frequency mixing of two input laser beams 160 and 170 in a nonlinear crystal 130. Sum-frequency mixing of input beams 160 and 170 generates an output beam 180 that is subject to walk-off in nonlinear crystal 130. In order to generate output beam 180 with high beam quality, the frequency-mixing technique of apparatus 100 utilizes (a) non-collinear critical phase matching to compensate for walk-off in the output beam 180 in conjunction with (b) input beam 170 being oblong in shape to maintain a good spatial overlap between input beams 160 and 170. Apparatus 100 includes two laser sources 110 and 120, and nonlinear crystal 130. Although not shown in FIG. 1, apparatus 100 may further include optical components that steer, focus, and/or shape input beams 160 and 170.

Laser source 110 generates input beam 160, and laser source 120 generates input beam 170. The wavelength A, and power of input beam 160 exceed the wavelength $\lambda_2$ and power, respectively, of input beam 170. Input beams 160 and 170 may be infrared, visible, or ultraviolet. In certain scenarios, where the frequency-mixing technique of apparatus 100 is found to be highly advantageous, input beam 160 is near-infrared and input beam 170 is ultraviolet. Herein, "near-infrared" refers to the wavelength range between 750 and 1400 nm. "Ultraviolet" refers to the wavelength range between 10 and 400 nm although, herein, ultraviolet beams more typically have a wavelength in the range between 100 and 400 nm, such as between 200 and 280 nm. Input beams 160 and 170 are incident on an input face 132 of nonlinear crystal 130. Input beams 160 and 170 propagate in the xz-plane of a right-handed cartesian coordinate system 198 and intersect in nonlinear crystal 130. (Herein, any reference to x-, y-, and z-axes, dimensions, directions, planes, etc. refers to coordinate system 198.) Sum-frequency mixing of input beams 160 and 170 produces output beam 180 with a wavelength $$\lambda_3 = \left(\lambda_1^{-1} + \lambda_2^{-1}\right)^{-1}.$$

Output beam 180 emerges from nonlinear crystal 130 at an output face 134 thereof.

The angle between input beams 160 and 170 in nonlinear crystal 130 is exaggerated for clarity in FIG. 1. Typically, the propagation directions of input beams 160 and 170 are within a few degrees of being parallel to each other, and input beams 160 and 170 generally propagate along in the z-direction. Faces 132 and 134 are at opposite ends of nonlinear crystal 130 in the z-dimension. Faces 132 and 134 are typically planar.

Input beams 160 and 170 may be collimated or focused in nonlinear crystal 130. In one example, input beams 160 and 170 are collimated, pulsed laser beams. In another example, input beams 160 and 170 are continuous-wave beams and are focused in nonlinear crystal 130 to achieve a desired conversion efficiency therein.

The optimal material choice for nonlinear crystal 130 depends on several factors, including the wavelengths of input beams 160 and 170 and the wavelength of output beam 180. In the case of output beam 180 being ultraviolet, possible material choices for nonlinear crystal 130 include $KH_2PO_4$ (KDP), $LiB_3O_5$(LBO), $\beta$-$BaB_2O_4$ (BBO), $CsLiB_6O_{10}$ (CLBO), $KBe_2BO_3F_2$ (KBBF) and derivates of KBBF. The following discussion assumes that nonlinear crystal 130 is a uniaxial crystal with a crystal axis C. The discussion is readily extendable to biaxial crystals. Crystal axis C is in the xz-plane. Input beams 160 and 170 propagate as ordinary beams in nonlinear crystal 130, and output beam 180 is an extraordinary beam. These polarizations are indicated in FIG. 1.

Figure 2:
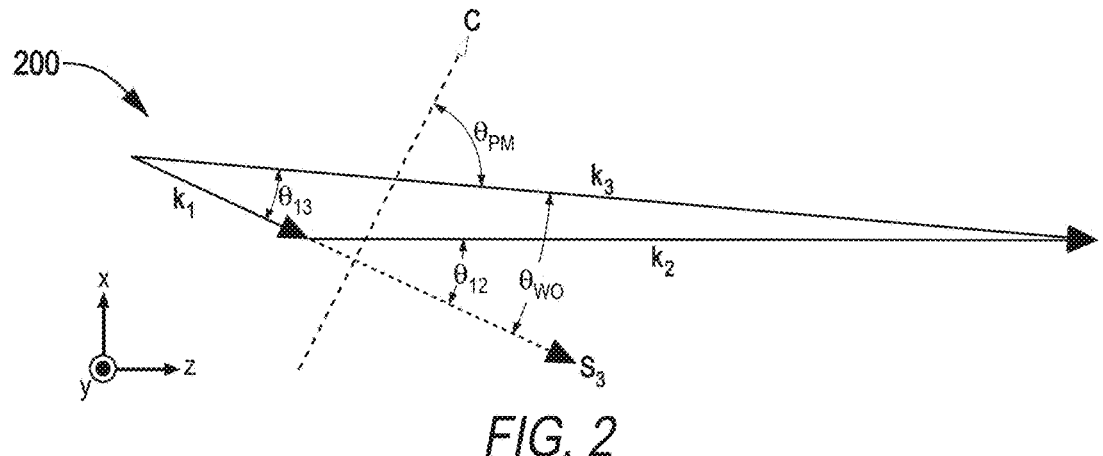
FIG. 2 is a phase matching diagram for fully walk-off-compensated, non-collinear phase matching in the nonlinear crystal of the FIG. 1 apparatus, according to an embodiment.

FIG. 2 is a phase matching diagram 200 for fully walk-off-compensated, non-collinear phase matching in nonlinear crystal 130 of apparatus 100. Input beams 160 and 170 have respective wave vectors $k_1$ and $k_2$ and respective Poynting vectors $S_1$ and $S_2$. (Poynting vectors $S_1$ and $S_2$ are not shown in FIG. 2.) Output beam 180 has a wave vector $k_3$ and a Poynting vector $S_3$. Since input beams 160 and 170 are ordinary beams, $S_1$ is parallel to $k_1$ and $S_2$ is parallel to $k_2$. Output beam 180 is subject to walk-off in the xz-plane. Since beam propagation inside nonlinear crystal 130 is typically within a few degrees of being parallel to the z-axis, walk-off is substantially parallel to the x-axis and the x-dimension is also referred to as the walk-off dimension. Poynting vector $S_3$ is at a walk-off angle $\theta_{WO}$ to wave vector $k_3$. (For clarity of illustration, angles are shown as being relatively large in FIG. 2. In most realistic examples, all angles are significantly smaller than depicted. For example, walk-off angles are typically less than 100 milliradians (mrad).)

Non-collinear phase matching is achievable for a range of angles $\theta_{12}$ between wave vectors $k_1$ and $k_2$ of input beams 160 and 170, respectively, and a corresponding range of phase matching angles $\theta_{PM}$ between crystal axis C and wave vector $k_3$ of output beam 180. However, to ensure parallel energy flow of input beam 160 and output beam 180, angle $\theta_{PM}$ is chosen such that angle $\theta_{13}$ between wave vector $k_1$ of input beam 160 and wave vector $k_3$ of output beam 180 equals walk-off angle $\theta_{WO}$. With this configuration, Poynting vector $S_1$ of input beam 160 is parallel to Poynting vector $S_3$ of output beam 180, while Poynting vector $S_2$ of input beam 170 is at a non-zero angle to Poynting vector $S_3$ of output beam 180.

When apparatus 100 is operated according to the fully walk-off-compensated scheme of FIG. 2, the energy of sum-frequency radiation generated along the propagation path of input beam 160 in nonlinear crystal 130 propagates in the same direction as input beam 160. This is the scenario depicted in FIG. 1. Consider, for example, the three locations 188 indicated in FIG. 1. Locations 188 are all at the same transverse location of input beam 160 but are longitudinally offset from each other along the propagation direction of input beam 160. Sum-frequency radiation generated at all locations 188 contributes to the same transverse location of output beam 180. This alignment eliminates walk-off induced distortion of the transverse intensity distribution of output beam 180.

Figure 3:
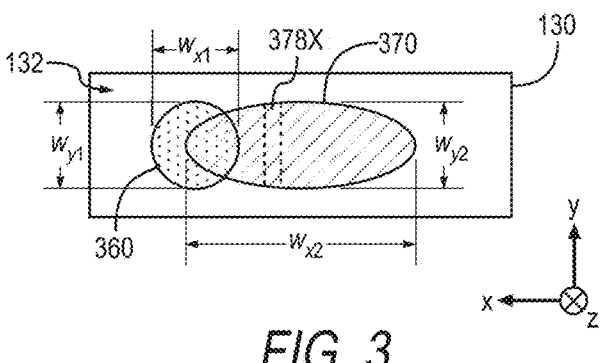
FIG. 3 shows exemplary transverse intensity distributions of the input beams at the input face of the nonlinear crystal in the FIG. 1 apparatus.

FIG. 3 shows input face 132 of nonlinear crystal 130 with exemplary transverse intensity distributions 360 and 370 of input beams 160 and 170, respectively, overlaid thereon. For simplicity, FIG. 3 depicts a scenario where input face 132 is parallel to the xy-plane and input beams 160 and 170 are incident on input face 132 at substantially normal incidence. In order to maximize spatial overlap between the non-collinear input beams 160 and 170, transverse intensity distribution 370 of input beam 170 is oblong. Each transverse intensity distribution 360 and 370 is indicated as a schematic $1/e^2$ envelope of the corresponding input beam. Input beam 160 may be a Gaussian or approximately Gaussian beam, for example with a circular cross section as shown in FIG. 3. Input beam 170 may be an elliptically shaped Gaussian beam (or approximately Gaussian) with the major axis of the ellipse parallel to the xz-plane. Alternatively, the oblong transverse intensity distribution of input beam 170 may have an approximately super-Gaussian or flat-top profile in the xz-plane.

Transverse intensity distribution 370 is elongated in the walk-off plane, as compared to the direction orthogonal to the walk-off plane, and has a significantly greater extent in the walk-off dimension than transverse intensity distribution 360 of input beam 160. In other words, input beam 170 is relatively wide and input beam 160 is relatively narrow in the walk-off dimension. As seen in FIG. 1, the greater width of input beam 170 in the walk-off dimension extends the interaction length between input beams 160 and 170. In one example, the $1/e^2$ x-axis width $w_{x2}$ of input beam 170 exceeds the $1/e^2$ x-axis width $w_{x1}$ of input beam 160 by 75% or more. The $1/e^2$ y-axis widths $w_{y1}$ and $w_{y2}$ of input beams 160 and 170 may be similar to each other, as shown in FIG. 3, or different.

The FIG. 3 schematic and above discussion are readily generalized to other orientations of input face 132 and corresponding incidence angles of input beams 160 and 170. More generally, input beams 160 and 170 are incident on input face 132 at respective incidence angles that result in input beams 160 and 170 propagating substantially along the z-axis inside nonlinear crystal 130. In this more general scenario, $w_{x1}$ and $w_{x2}$ are replaced with the respective transverse dimensions of input beams 160 and 170 orthogonally to the y-axis.

Figure 4:
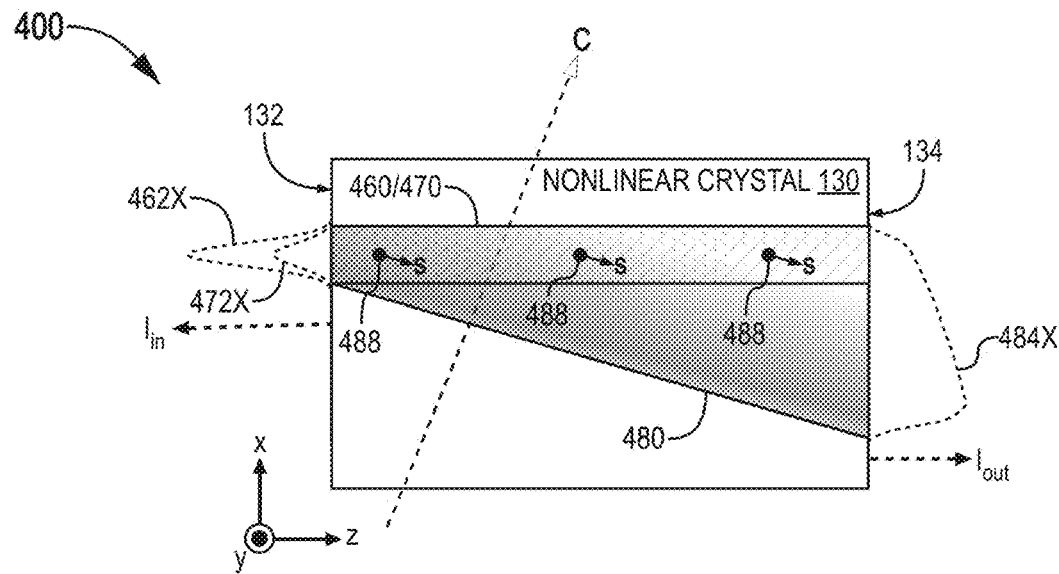
FIG. 4 shows beam propagation in the nonlinear crystal of the FIG. 1 apparatus if, instead, utilizing conventional collinear phase matching.

FIG. 4 shows beam propagation in nonlinear crystal 130 if, instead, conventional collinear phase matching was utilized. In this case, two similarly-sized, circular Gaussian input beams 460 and 470 co-propagate through nonlinear crystal 130. With collinear type-I phase matching, sum-frequency mixing of input beams 460 and 470 produces an output beam 480.

Figure 5:
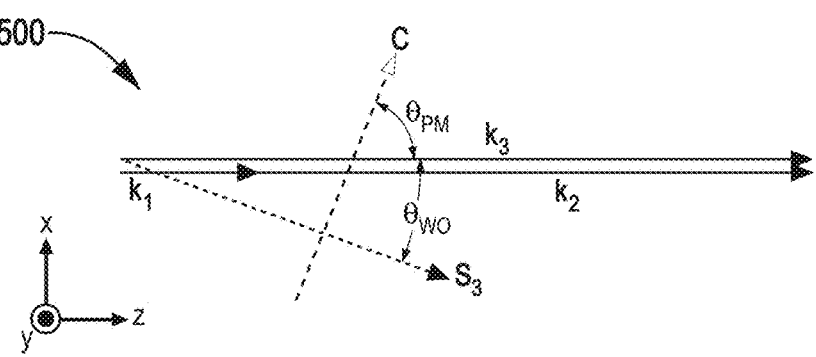
FIG. 5 shows the phase matching diagram for the collinearly phase-matched sum-frequency mixing process in FIG. 4.

FIG. 5 shows the collinear phase matching diagram 500 for the collinearly phase-matched sum-frequency mixing process in FIG. 4. Beams 460, 470, and 480 have parallel wave vectors $k_1$, $k_2$, and $k_3$. Collinear phase matching is achieved at a phase matching angle $\theta_{PM}$ between the wave vector $k_3$ of output beam 180 and crystal axis C. The Poynting vector $S_3$ of output beam 480 is at a walk-off angle $\theta_{WO}$ to wave vector $k_3$. The energy-flow of output beam 480 therefore propagates at a non-zero angle (walk-off angle $\theta_{WO}$) away from the region of spatial overlap between input beams 460 and 470.

Consider three locations 488 (shown in FIG. 4) at the same transverse location of input beam 460 but longitudinally offset from each other along the propagation direction of input beam 460. Sum-frequency radiation generated at different locations 488 will not overlap. Output beam 480 is therefore significantly wider in the walk-off dimension than input beams 460 and 470. Output beam 480 emerges from nonlinear crystal 130 with a distinctly non-Gaussian intensity profile 484X in the walk-off dimension. When depletion of input beams 460 and 470 is negligible, the transverse intensity distribution of output beam 480 has an approximately flat-top profile in the walk-off dimension. In the example depicted in FIG. 4, however, input beam 460 is sufficiently powerful to cause substantial depletion of input beam 470. Therefore, intensity profile 484X instead is extended in a non-uniform fashion. The beam quality of output beam 480 is substantially degraded as compared to input beams 460 and 470.

In contrast, in the non-collinear phase matching scheme in apparatus 100 (FIGS. 1-3), the beam quality of output beam 180 may be similar to that of input beam 160. As shown in FIG. 1, the narrower input beam 160 cuts through the wider input beam 170 inside nonlinear crystal 130. The width and propagation direction of the narrower input beam 160 essentially defines the region of spatial overlap between input beams 160 and 170. In the fully walk-off-compensated scenario shown in FIG. 1, the orientation of the region of spatial overlap between input beams 160 and 170 is parallel to the Poynting vector $S_3$ of output beam 180 and prevents walk-off induced distortion of the transverse intensity distribution of output beam 180, despite the different propagation direction of input beam 170.

FIG. 1 depicts an example where input beams 160 and 170 are Gaussian with respective Gaussian intensity profiles 162X and 172X in the xz-plane. In the fully walk-off-compensated scenario, wherein input beam 160 and output beam 180 have parallel energy flows in nonlinear crystal 130, output beam 180 has a Gaussian intensity profile 184X in the walk-off dimension. Gaussian intensity profile 184X of output beam 180 is similar to Gaussian intensity profile 162X of input beam 160. Output beam 180 does not suffer from the beam quality degradation afflicting the collinear phase matching scheme of FIGS. 4 and 5.

Furthermore, depletion of either one of input beams 160 and 170 does not have an adverse impact on the beam quality of output beam 180. To the contrary, apparatus 100 is particularly advantageous when input beam 160 is sufficiently powerful to cause substantial depletion of input beam 170, for example when the power of input beam 170 is at most 10% or at most 1% of the power of input beam 160. (Herein, the term "substantial depletion" may refer to at least a 25% reduction in power.) Consider each individual x-axis segment of input beam 170 (one x-axis segment 378X is indicated in FIG. 3). Due to the non-collinear arrangement of input beams 160 and 170, the interaction length between input beam 160 and each individual x-axis segment of input beam 170 is relatively short. Therefore, the power of input beam 170 is most effectively transferred to output beam 180 when input beam 160 is sufficiently powerful to cause substantial depletion of input beam 170, for example when input beam 170 is a relatively weak ultraviolet laser beam, while input beam 160 is a more powerful near-infrared or visible laser beam. Input beam 160 may be generated by a high power laser system, such as a fiber laser. Alternatively, a high-power input beam 160 may be achieved by placing nonlinear crystal 130 in a resonant enhancement cavity or inside a laser resonator. In such scenarios, the beam quality improvements provided by apparatus 100, as compared to an apparatus implementing a conventional collinear phase matching scheme, may be achieved with little or no loss in overall frequency conversion efficiency. In some cases, the overall frequency conversion efficiency actually improves.

Nonlinear crystal 130 has a length 130L in the z-dimension. As compared to the depicted transverse envelopes of input beams 160 and 170, length 130L is in most cases far greater than shown in FIG. 1. For example, length 130L may be 20 millimeters (mm) or more, while the transverse envelopes of input beams 160 and 170 may be only a fraction of a millimeter. In order to avoid unnecessary laser beam propagation inside nonlinear crystal 130, input beams 160 and 170 may overlap at both input face 132 and output face 134. In implementations where input beams 160 and 170 overlap in this manner, the power of output beam 180 may be maximized when the transverse centers of input beams 160 and 170 cross at or near the center of nonlinear crystal 130, for example in the middle third of the propagation path of input beam 170 between faces 132 and 134 (i.e., at a location that is no more than one sixth of the total propagation distance away from the halfway point).

The fully walk-off-compensated phase matching scheme, shown in FIG. 2 and discussed above, represents an optimal case as far as output beam quality is concerned. In some scenarios it may be sufficient or preferred to reduce but not eliminate the angle between the Poynting vectors of input beam 160 and output beam 180. This may be the case, for example, when a longer interaction length between input beam 160 and each x-axis segment of input beam 170 is needed to achieve a required frequency conversion efficiency.

Figure 6:
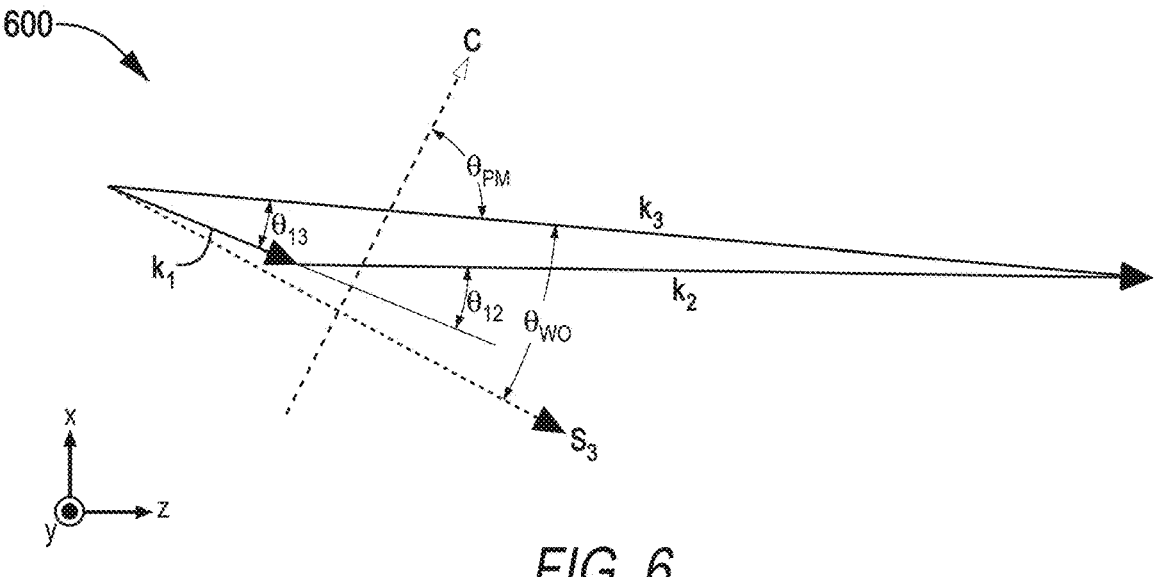
FIG. 6 is a phase matching diagram for fully or partly walk-off-compensated, non-collinear phase matching in the nonlinear crystal of the FIG. 1 apparatus, according to an embodiment.

FIG. 6 is a phase matching diagram 600 for fully or partly walk-off-compensated non-collinear phase matching in nonlinear crystal 130 of apparatus 100. Phase matching diagram 200 of FIG. 2 is a special case of phase matching diagram 600. In phase matching diagram 600, the wave vectors of input beams 160 and 170 are angled away from each other in a manner that reduces the angle between the Poynting vectors of input beam 160 and output beam 180, as compared to collinear phase matching. Wave vector $k_1$ of input beam 160 (together with its parallel Poynting vector $S_1$) is angled away from wave vector $k_3$ of output beam 180 in the direction toward Poynting vector $S_3$ of output beam 180. Wave vector $k_1$ of input beam 160 is at a non-zero angle $\theta_{12}$ to wave vector $k_2$ of input beam 170 (and its parallel Poynting vector $S_2$), and wave vector $k_2$ of input beam 170 (together with its parallel Poynting vector $S_2$) is angled away from Poynting vector $S_3$ of output beam 180. Angle $\theta_{13}$ between wave vector $k_1$ of input beam 160 and wave vector $k_3$ of output beam 180 is an increasing function of angle $\theta_{12}$. As angle $\theta_{12}$ is increased from zero, angle $\theta_{13}$ increases to reduce the angle between the energy flows of input beam 160 and output beam 180, until reaching the fully walk-off-compensated case where $\theta_{13}$ equals walk-off angle $\theta_{WO}$ and the energy flows of input beam 160 and output beam 180 are parallel.

In some scenarios, the output beam quality improves dramatically as angle $\theta_{13}$ is first increased from zero, whereafter the improvement gradually slows. In certain embodiments, apparatus 100 is therefore configured to operate with angle $\theta_{13}$ being, e.g., at least 50% of walk-off angle $\theta_{WO}$, while providing nearly as good an output beam quality as with the fully walk-off-compensated scheme of FIG. 2.

FIGS. 7, 8, 9, and 10 are data plots illustrating exemplary modeled performance of apparatus 100 when applied to the generation of a 213 nm continuous-wave laser beam from sum-frequency mixing of 1064 nm and 266 nm continuous-wave laser beams. In this example, input beam 160 has a wavelength of 1064 nm and a power of 1.0 kilowatts (kW), input beam 170 has a wavelength of 266 nm and a power of 1 W, and nonlinear crystal 130 is a BBO crystal with a length 130L of 6 mm. Input beams 160 and 170 are Gaussian and cross in the center of nonlinear crystal 130. Each of FIGS. 7-10 plots the beam quality factor $$M_x^2$$

in the x-dimension affected by walk-off (data set 710, closed circles) and the frequency-converted output power (data set 720, open circles) as a function of angle $\theta_{12}$ between input beams 160 and 170 inside nonlinear crystal 130. Nonlinear crystal 130 is Brewster-cut for the 1064 nm input beam. The walk-off angle $\theta_{WO}$ is 96 mrad, corresponding to angle $\theta_{12}$ being approximately 120 mrad in the fully walk-off-compensated scheme of phase matching diagram 200 (FIG. 2). With a crystal temperature of 30 degrees Celsius, the phase matching angle $\theta_{PM}$ is 51.3 degrees in the fully walk-off-compensated scheme (and 51.2 degrees in collinear phase matching).

Figures 7, 8, 9, 10:
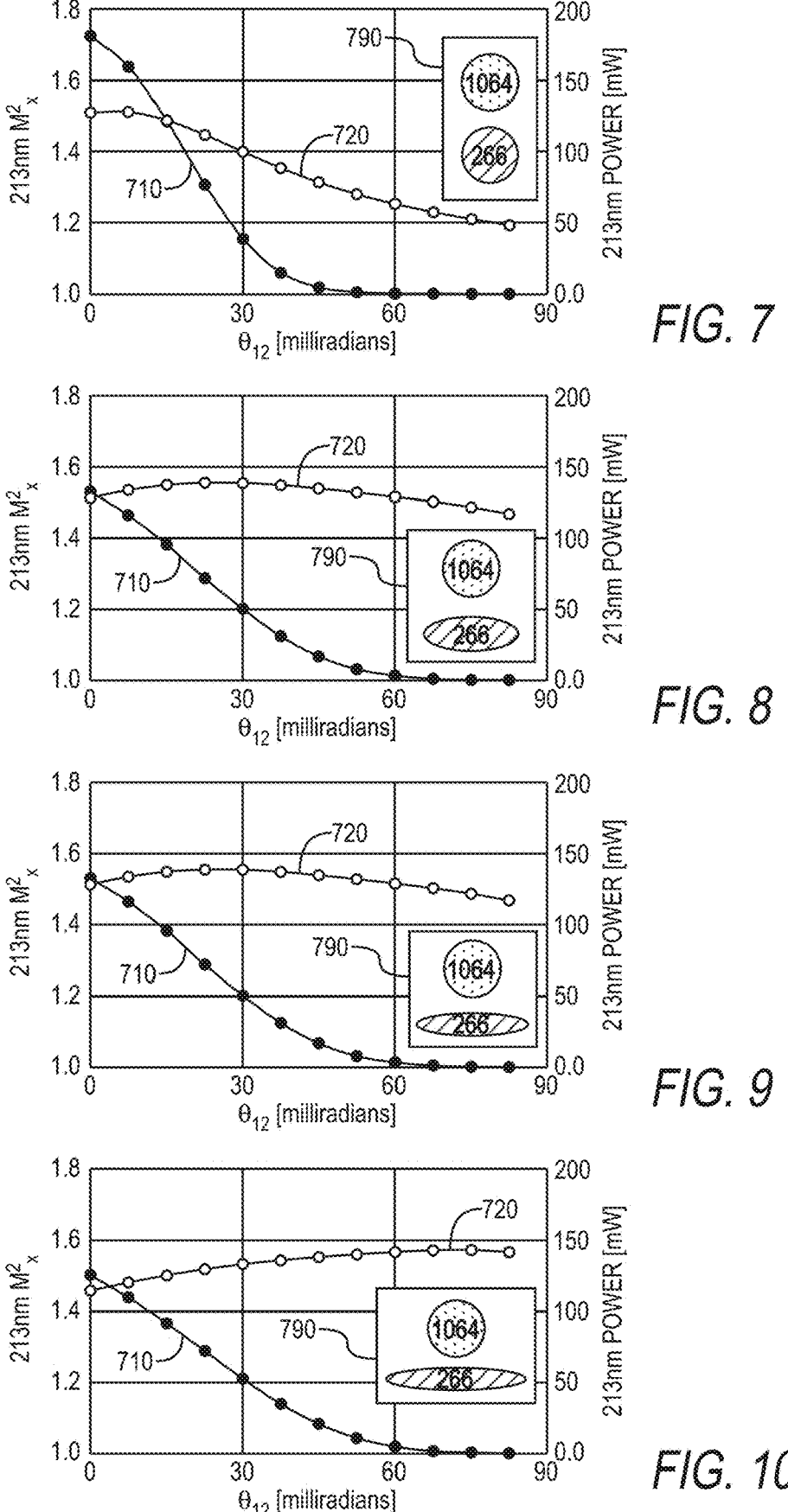
FIG. 7 is a data plot illustrating exemplary performance of the FIG. 1 apparatus modified to operate with two circular input beams and applied to the generation of a 213 nm continuous-wave laser beam from sum-frequency mixing of 1064 nm and 266 nm continuous-wave laser beams, and comparing the performance to that achieved with collinear phase matching of the circular input beams.
FIGS. 8, 9, and 10 are data plots illustrating exemplary performance of the FIG. 1 apparatus when applied to the generation of a 213 nm continuous-wave laser beam from sum-frequency mixing of 1064 nm and 266 nm continuous-wave laser beams for different respective widths of the 266 nm beam in the walk-off dimension, and comparing the performance to that achieved with collinear phase matching.

For comparison purposes, the data shown in each of FIGS. 7-10 includes data pertaining to conventional collinear phase matching ($\theta_{12}$=0), and the FIG. 7 data is obtained with a circular, rather than oblong, input beam 170. Each of FIGS. 7-10 includes a diagram 790 indicating the shape of the transverse intensity distribution of the 1064 nm and 266 nm input beams. Both input beams are circular in FIG. 7, with a $1/e^2$ diameter of 70 micrometers (μm) when incident on nonlinear crystal 130. In FIGS. 8-10, input beam 170 is elliptical and made increasingly oblong through the series of data plots, while input beam 160 remains circular with a $1/e^2$ diameter of 70 μm.

As seen in FIG. 7, conventional collinear phase matching ($\theta_{12}$=0) with circular input beams yields an output power of 128 milliwatts (mW) and a beam quality factor $$M_x^2$$

of 1.73. This relatively poor beam quality reflects that output beam 180 is generated under the circumstances depicted in FIG. 4, with input beam 160 substantially depleting input beam 170 such that output beam 180 has a sloped-top intensity profile in the walk-off dimension. As the angle $\theta_{12}$ between input beams 160 and 170 is increased, according to the non-collinear phase matching scheme of FIG. 6, the beam quality improves but the output power decreases as well. A beam quality factor of less than 1.05 is achieved at an angle $\theta_{12}$ of 40 mrad. This is large improvement in beam quality. However, any significant beam quality improvement with circular input beams comes at the cost of a reduction in output power, which is undesirable in many scenarios.

As evident from FIGS. 8-10, higher output powers are achieved when non-collinear phase matching is performed with an oblong input beam 170. In the case of FIG. 8, the $1/e^2$ width of input beam 170 is increased to 140 μm in the walk-off dimension (and decreased to 35 μm in the orthogonal dimension). With this oblong shape, an output power of at least 128 mW is maintained while $\theta_{12}$ is increased gradually to achieve a beam quality factor $$M_x^2$$

of less than 1.05 when $\theta_{12}$ is 50 mrad. A maximum output power of 138 mW is obtained when $\theta_{12}$ is approximately 30 mrad. In FIG. 9, the $1/e^2$ width of input beam 170 is further increased to 158 μm in the walk-off dimension (and decreased to 31 μm in the orthogonal dimension). Advantageously, optimal output power and optimal beam quality are achieved at more similar values of $\theta_{12}$. A reasonable compromise is found at a value of about 50 mrad. Further increasing the $1/e^2$ width of input beam 170 in the walk-off dimension to 175 μm in FIG. 10 (and reducing the orthogonal $1/e^2$ width to 28 μm) further improves the beam quality and also leads to a non-negligible improvement in output power. When $\theta_{12}$ is approximately 70 mrad, the beam quality factor drops to below 1.01, corresponding to an almost perfectly Gaussian beam, and the output power reaches approximately 143 mW, which is 10% more than achieved with conventional collinear phase matching and circular input beams.

Figure 11:
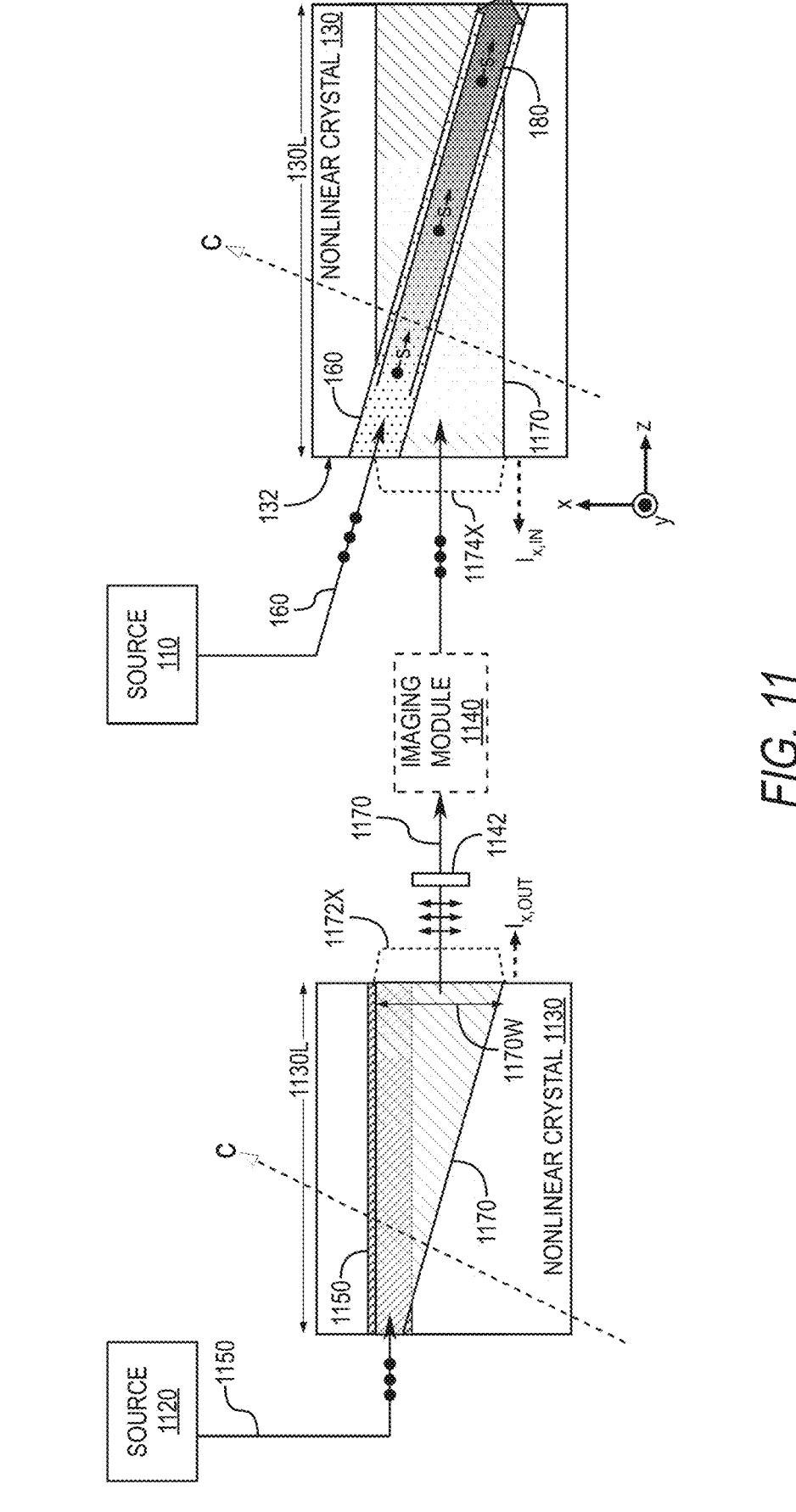
FIG. 11 illustrates a laser apparatus with non-collinear type-I phase-matched sum-frequency mixing of two input laser beams preceded by a frequency-conversion process that, as a result of walk-off, inherently generates one of the two input laser beams with an oblong, flat-top transverse intensity distribution, according to an embodiment.

FIG. 11 illustrates one laser apparatus 1100 with non-collinear type-I phase-matched sum-frequency mixing of two input laser beams preceded by another frequency-conversion process that, as a result of walk-off, inherently generates one of the two input laser beams with an oblong, flat-top transverse intensity distribution. Apparatus 1100 is an embodiment of apparatus 100 wherein source 120 generates input beam 170 in a frequency-conversion process. Apparatus 1100 includes source 110, nonlinear crystal 130, a source 1120, and a nonlinear crystal 1130. Source 1120 and nonlinear crystal 1130 form an embodiment of source 120 of apparatus 100.

Source 1120 generates a laser beam 1150 that undergoes collinearly phase-matched frequency conversion in nonlinear crystal 1130 to produce a frequency-converted laser beam 1170. In the depicted example, laser beam 1150 is frequency doubled in nonlinear crystal 1130, and laser beam 1150 propagates in nonlinear crystal 1130 as an ordinary beam. Laser beam 1150 may be a Gaussian beam with a circular cross section. Frequency-converted beam 1170 is an example of input beam 170 and undergoes sum-frequency mixing with input beam 160 in nonlinear crystal 130 in the manner discussed above in reference to apparatus 100.

One embodiment of apparatus 1100 further includes an imaging module 1140, e.g., an imaging lens(es), that images frequency-converted beam 1170 from nonlinear crystal 1130 to nonlinear crystal 130. Imaging module 1140 is useful in scenarios where the input beams to nonlinear crystals 1130 and 130 are focused in the respective crystals, for example when apparatus 1100 is operated with continuous-wave beams. In scenarios where the input beams are instead collimated, for example when the input beams are pulsed, imaging module 1140 may be a telescope that relays frequency-converted beam 1170 from nonlinear crystal 1130 to nonlinear crystal 130. Imaging module 1140 may magnify or demagnify frequency-converted beam 1170 between nonlinear crystals 1130 and 130.

Frequency-converted beam 1170 is an extraordinary beam in nonlinear crystal 1130 and is therefore subject to walk-off. This walk-off causes the transverse intensity distribution of frequency-converted beam 1170 to be elongated in the walk-off dimension for nonlinear crystal 1130. The frequency-conversion process in nonlinear crystal 1130 takes place without significant depletion of the input beams, such that the transverse intensity distribution of frequency-converted beam 1170 has an at least approximately flat-top (or super-Gaussian) profile 1172X in the walk-off dimension for nonlinear crystal 1130. Apparatus 1100 thereby conveniently benefits from walk-off in nonlinear crystal 1130 to generate frequency-converted beam 1170 with the oblong transverse intensity distribution that is needed in the sum-frequency mixing process in nonlinear crystal 130.

In the example depicted in FIG. 11, apparatus 1100 includes a halfwave plate 1142 that rotates the polarization of frequency-converted beam 1170 between nonlinear crystals 1130 and 130, such that frequency-converted beam 1170 propagates in nonlinear crystal 130 as an ordinary beam. Alternatively, nonlinear crystals 1130 and 130 may be arranged at right angles to each other, or the polarization of frequency-converted beam 1170 may be rotated in a different manner.

In one embodiment, source 1120 is a frequency-doubled Nd:YAG (or Nd:YVO₄) laser and generates laser beam 1150 with a wavelength of 532 nm, and nonlinear crystal 1130 is a beta barium borate (BBO) crystal that frequency doubles the 532 nm beam with collinear type-I phase matching to generate frequency-converted beam 1170 with a wavelength of 266 nm. In this embodiment, source 110 may be another Nd:YAG (or Nd:YVO₄) laser that generates input beam 160 with a wavelength of 1064 nm, and nonlinear crystal 130 may be a BBO crystal that generates a 213 nm output beam 180 from sum-frequency mixing of the 266 nm and 1064 nm input beams.

The transverse intensity distribution of frequency-converted beam 1170, when emerging from nonlinear crystal 1130, has a profile 1172X in the walk-off dimension for nonlinear crystal 1130. Intensity profile 1172X has a width 1170W. At input face 132 of nonlinear crystal 130, the transverse intensity distribution of frequency-converted beam 1170 has a profile 1174X in the walk-off dimension for nonlinear crystal 130. In the example depicted in FIG. 11, imaging module 1140 is a 1:1 imager that images the size and shape of frequency-converted beam 1170 from nonlinear crystal 1130 to nonlinear crystal 130, such that intensity profile 1174X also has width 1170W. Alternatively, frequency-converted beam 1170 may be magnified or demagnified between nonlinear crystals 1130 and 130 by imaging module 1140, in which case the shape of intensity profile 1174X resembles that of intensity profile 1172X but with a different width. The length 1130L of nonlinear crystal 1130 may be set to achieve a width 1170W of frequency-converted beam 1170 that results in frequency-converted beam 1170 having a desired corresponding width in nonlinear crystal 130.

In the above discussion of apparatus 100 and its embodiments, the wavelength of input beam 160 exceeds that of input beam 170. Apparatus 100 and its embodiments may instead be operated with the opposite relationship between the input beam wavelengths, or even with input beams 160 and 170 of the same wavelength.

Apparatus 100 may also be operated with the power of input beam 170 exceeding the power of input beam 160, or with input beams 160 and 170 having similar powers. Such modified power relationships between input beams 160 and 170 are however less advantageous in terms of optimizing frequency conversion efficiency.

Apparatus 100 and its embodiments may be modified to perform other types of sum-frequency mixing or difference-frequency mixing than type-I sum-frequency mixing, while maintaining the non-collinear phase matching scheme of FIG. 6 as well as the oblong shape of input beam 170. More generally, the frequency-mixing technique based on non-collinear phase matching diagram 600 in conjunction with an oblong input beam 170 is applicable to sum- or difference-frequency mixing processes wherein walk-off of one or more of the interacting laser beams, in a collinear phase matching scheme, results in the Poynting vector of the output beam being non-collinear with the Poynting vector of one or both of the input beams. Two examples are discussed below in reference to FIGS. 12 and 13.

Figure 12:
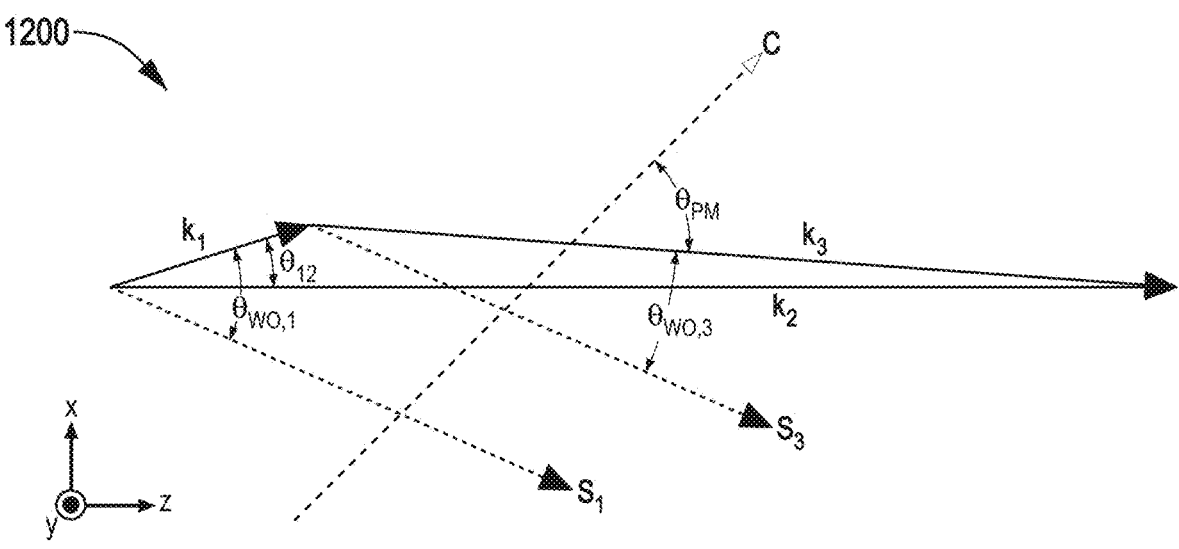
FIG. 12 is a phase matching diagram for non-collinear type-II phase-matched difference-frequency generation in a positive uniaxial nonlinear crystal, wherein one input beam is longer-wavelength extraordinary beam, another input beam is a shorter-wavelength ordinary beam, and the output beam is an extraordinary beam, according to an embodiment.

FIG. 12 is a phase matching diagram 1200 for non-collinear type-II phase-matched difference-frequency generation in a positive uniaxial nonlinear crystal, wherein input beam 160 is a longer-wavelength extraordinary beam, input beam 170 is a shorter-wavelength ordinary beam, and output beam 180 is an extraordinary beam. In this example, both input beam 160 and output beam 180 are subject to walk-off with the walk-off angle $\theta_{WO,1}$ for input beam 160 exceeding the walk-off angle $\theta_{WO,3}$ for output beam 180. Angle $\theta_{12}$ between the wave vectors of input beams 160 and 170 is chosen to more closely align Poynting vector $S_1$ of input beam 160 with Poynting vector $S_3$ of output beam 180. The oblong shape of input beam 170 helps maintain a good spatial overlap between input beams 160 and 170, even though Poynting vector $S_2$ of input beam 170 is less well aligned with Poynting vector $S_3$ of output beam 180.

Figure 13:
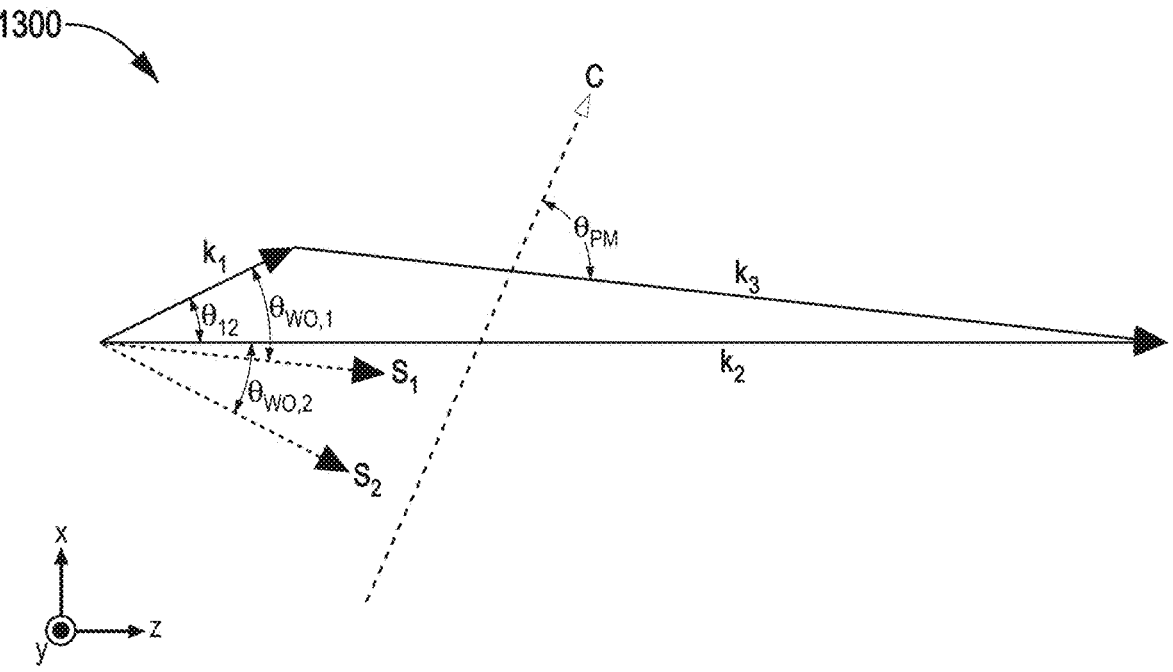
FIG. 13 is a phase matching diagram for non-collinear type-I phase-matched difference-frequency generation in a negative uniaxial nonlinear crystal, wherein both input beams are extraordinary beams, and the output beam is an ordinary beam, according to an embodiment.

FIG. 13 is a phase matching diagram 1300 for non-collinear type-I phase-matched difference-frequency generation in a negative uniaxial nonlinear crystal, wherein both input beams 160 and 170 are extraordinary beams and output beam 180 is an ordinary beam. Here, Poynting vector $S_3$ of output beam 180 is parallel to its wave vector $k_3$. Again, angle $\theta_{12}$ between the wave vectors of input beams 160 and 170 is chosen to more closely align Poynting vector $S_1$ of input beam 160 with Poynting vector $S_3$ of output beam 180. Also in this case, the oblong shape of input beam 170 helps maintain a good spatial overlap between input beams 160 and 170, even though Poynting vector $S_2$ of input beam 170 is less well aligned with Poynting vector $S_3$ of output beam 180.

The preceding discussion of apparatus 100 and its embodiments, as well as the modifications to perform other types of sum-frequency mixing or difference-frequency mixing than type-I sum-frequency mixing, may be extended to non-oblong shapes of input beam 170. While the oblong shape of input beam 170 is optimal for frequency conversion efficiency, the improvements in the output beam quality do not require that input beam 170 is oblong. More generally, improvements in beam quality are achieved when the transverse size of input beam 170, in the walk-off plane, exceeds the corresponding transverse size of input beam 160. For example, input beams 160 and 170 may both be circular, but with the transverse size of input beam 170 exceeding that of input beam 160.

The present invention is described above in terms of a preferred embodiment and other embodiments. The invention is not limited, however, to the embodiments described and depicted herein. Rather, the invention is limited only by the claims appended hereto.

What is claimed is:

1. A laser apparatus with non-collinearly phase-matched frequency mixing, comprising:
   a first laser source configured to generate a first input laser beam;
   a second laser source configured to generate a second input laser beam; and
   a first nonlinear crystal arranged to generate an output laser beam from non-collinearly phase-matched frequency mixing of the first and second input laser beams, wherein:
   (a) the output laser beam is subject to walk-off in a walk-off plane in the first nonlinear crystal,
   (b) wave vectors of the first and second input laser beam are non-collinear and intersecting in the first nonlinear crystal,
   (c) the second input laser beam has a lower power than the first input laser beam in the first nonlinear crystal,
   (d) in the first nonlinear crystal, an angle between a Poynting vector of the first input laser beam and a Poynting vector of the output laser beam is smaller than an angle between a Poynting vector of the second input laser beam and the Poynting vector of the output laser beam, and
   (e) the second input laser beam has a greater transverse size than the first input laser beam in the walk-off plane in the first nonlinear crystal.

2. The laser apparatus of claim 1, wherein the second input laser beam has an oblong transverse intensity distribution that is elongated in the walk-off plane.

3. The laser apparatus of claim 1, wherein the second input laser beam is ultraviolet.

4. The laser apparatus of claim 3, wherein the first input laser beam is near-infrared and the non-collinearly phase-matched frequency mixing is sum-frequency mixing.

5. The laser apparatus of claim 1, wherein the non-collinearly phase-matched frequency mixing is type-I sum-frequency mixing.

6. The laser apparatus of claim 1, wherein the second laser beam is an elliptical Gaussian beam, or the oblong transverse intensity distribution has a flat-top or super-Gaussian profile in the walk-off plane.

7. The laser apparatus of claim 1, wherein the power of the second input laser beam is at most ten percent of the power of the first input laser beam when incident on the first nonlinear crystal.

8. The laser apparatus of claim 1, wherein the second laser source includes a second nonlinear crystal configured to generate the second input laser beam by frequency converting a third laser beam with collinear phase matching, the oblong transverse intensity distribution being caused by walk-off of the second input laser beam in the second nonlinear crystal.

9. The laser apparatus of claim 8, wherein the first and second input laser beams are continuous-wave laser beams, the apparatus further comprising an imaging module configured to image the second input laser beam from the second nonlinear crystal to the first nonlinear crystal.

10. The laser apparatus of claim 8, wherein the second nonlinear crystal is configured to form the second input laser beam as a second harmonic of the third laser beam.

11. The laser apparatus of claim 1, wherein the first laser source includes a laser resonator, the first nonlinear crystal being positioned in the laser resonator.

12. The laser apparatus of claim 1, further comprising a resonant enhancement cavity arranged to receive the first input laser beam from the first laser source, the first nonlinear crystal being positioned in the resonant enhancement cavity.

13. The laser apparatus of claim 1, wherein a crossing point between respective transverse centers of the first and second input laser beams is inside a middle third of a propagation path of the second input laser beam through the first nonlinear crystal.

14. The laser apparatus of claim 1, wherein, in the first nonlinear crystal, the output laser beam has a walk-off angle, and the Poynting vector of the first input laser beam is oriented within half the walk-off angle of the output laser beam.

15. The laser apparatus of claim 1, wherein the transverse size of the second input laser beam exceeds the transverse size of the first input laser beam by at least 75 percent.

16. The laser apparatus of claim 1, wherein the second input laser beam is a fourth harmonic of the first input laser beam, and the output laser beam is a fifth harmonic of the first input laser beam.

17. A method for non-collinearly phase-matched frequency mixing of laser beams, comprising steps of:
  generating first and second input laser beams; and
  directing the first and second input laser beams into a first nonlinear crystal such that (i) wave vectors of the first and second input laser beams are non-collinear and intersect in the first nonlinear crystal, and (ii) the first and second wave vectors cooperate with the orientation of the first nonlinear crystal to promote non-collinearly phase-matched frequency mixing of the first and second input laser beams resulting in generation of an output laser beam, the output laser beam is subject to walk-off in a walk-off plane in the first nonlinear crystal;
wherein:
  the first input laser beam is more powerful than the second input laser beam,
  the transverse size of the second input laser beam, in the walk-off plane, exceeds a corresponding transverse size of the first input laser beam, and
  in the first nonlinear crystal, an angle between a Poynting vector of the first input laser beam and a Poynting vector of the output laser beam is smaller than an angle between a Poynting vector of the second input laser beam and the Poynting vector of the output laser beam.

18. The method of claim 17, wherein the second input laser beam has an oblong transverse intensity distribution that is elongated in the walk-off plane.

19. The method of claim 17, wherein at least 25 percent of power in the second laser beam is transferred to the output laser beam.

20. The method of claim 17, wherein the non-collinearly phase-matched frequency mixing is type-I sum-frequency mixing.

21. The method of claim 17, wherein the generating step includes a step of frequency converting a third laser beam in a second nonlinear crystal to generate the second input laser beam, the oblong transverse intensity distribution being caused by walk-off of the second input laser beam in the second nonlinear crystal.

22. The method of claim 21, wherein the frequency converting step causes the oblong transverse intensity distribution to have a flat-top or super-Gaussian profile in the walk-off plane.

23. The method of claim 17, wherein the generating step includes generating the second input laser beam as a fourth harmonic of the first input laser beam.

24. The method of claim 17, wherein the generating step includes generating the first input laser beam inside a laser resonator containing the first nonlinear crystal.

* * * * *